May 11, 1965 W. N. WOODALL 3,182,988
WELDING FIXTURE
Filed June 7, 1962 3 Sheets-Sheet 2
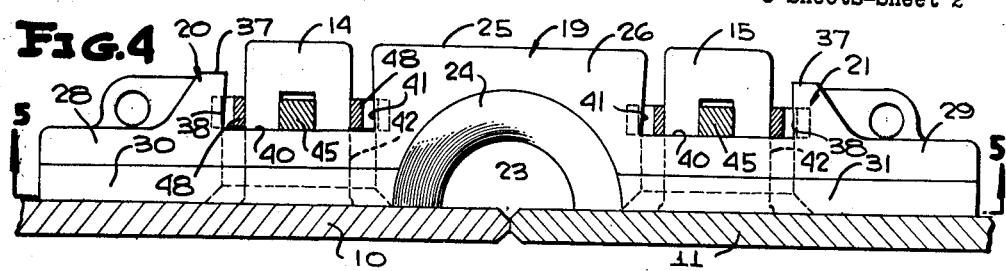
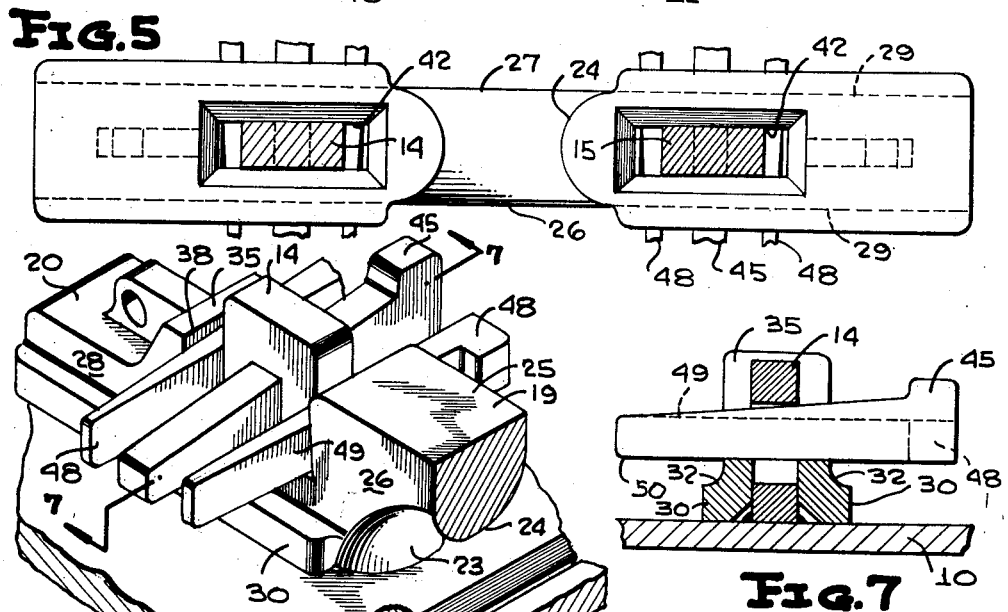
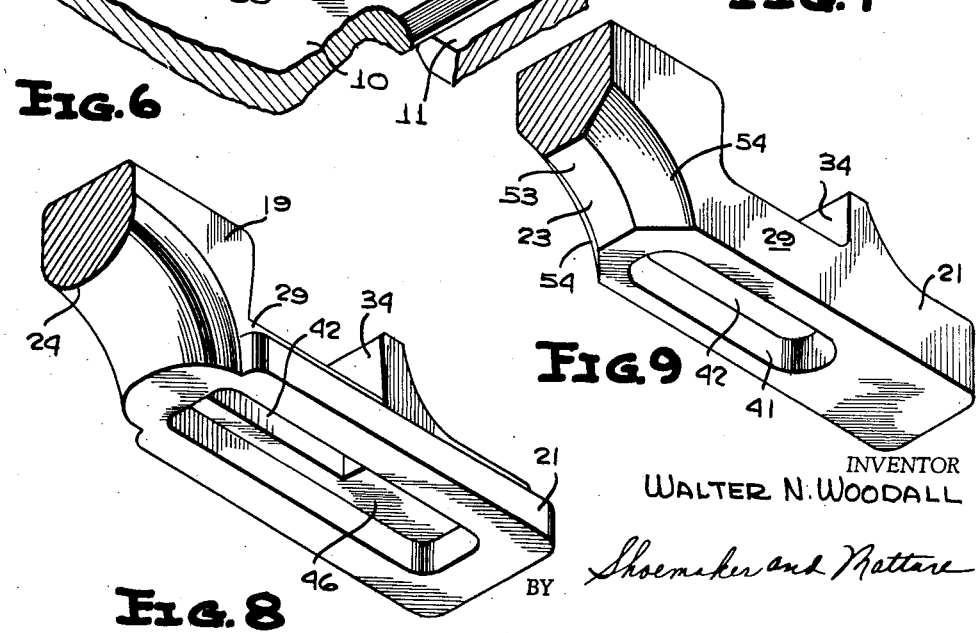
INVENTOR
WALTER N. WOODALL
BY Shoemaker and Mattare
ATTORNEYS May 11, 1965     W. N. WOODALL     3,182,988
WELDING FIXTURE
Filed June 7, 1962                           3 Sheets-Sheet 3
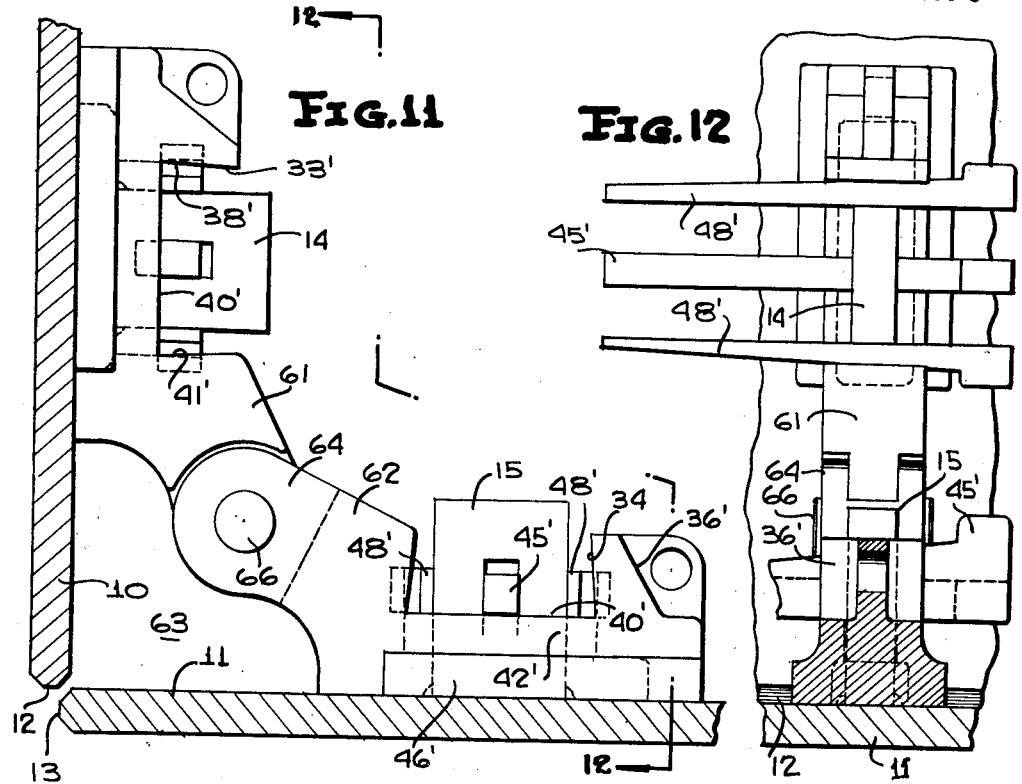
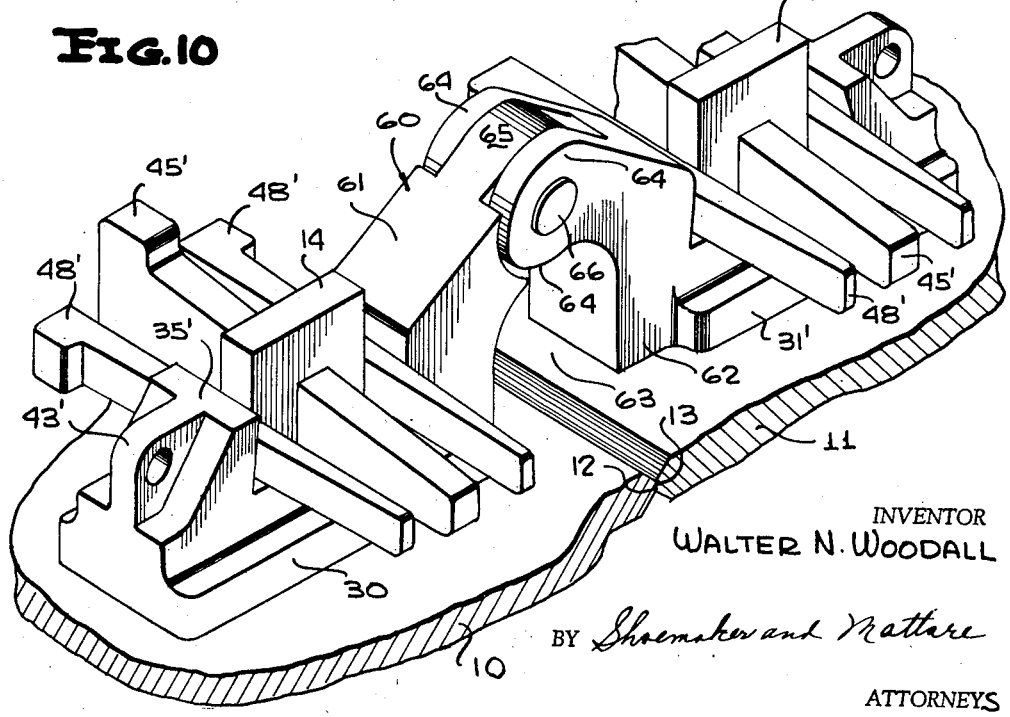
INVENTOR
WALTER N. WOODALL
BY Shoemaker and Mattare
ATTORNEYS 3,182,988
WELDING FIXTURE
Walter N. Woodall, Newport News, Va., assignor to Newport News Shipbuilding and Dry Dock Company, Newport News, Va., a corporation of Virginia
Filed June 7, 1962, Ser. No. 200,724
2 Claims. (Cl. 269—37)

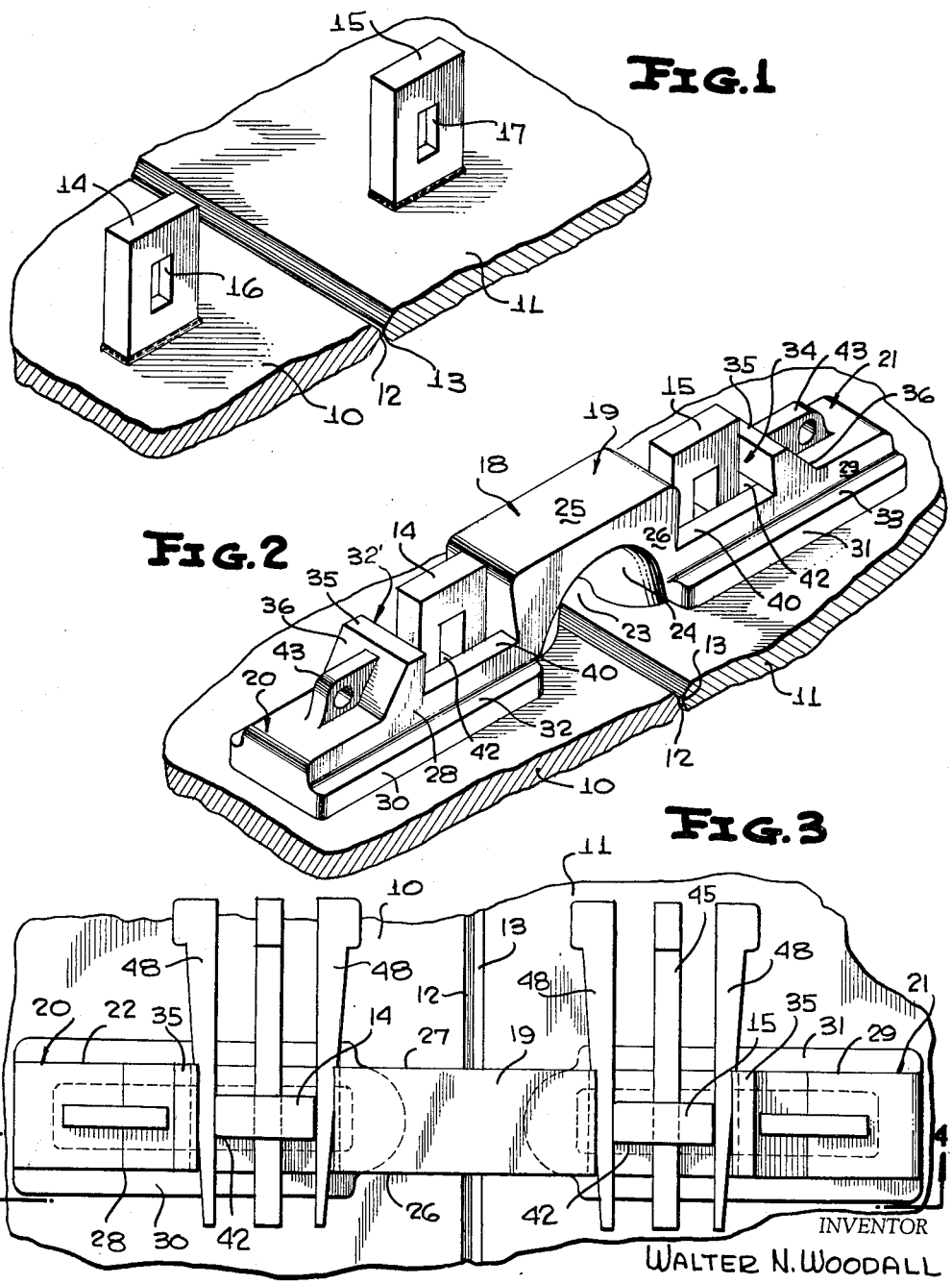

The present invention relates to a welding apparatus and more particularly to an apparatus in the nature of a fixture or jig whereby two heavy steel plates or the like may be disposed in fixed relationship to one another to permit welding of the plates together.

In welding two heavy steel plates to one another it is necessary to properly position the plates adjacent each other a predetermined distance apart to permit precision welding and to accomplish the welding in a most expedient manner. It is also desirable to utilize the structure of the steel plates themselves to properly position them with respect to one another, instead of having appurtenant equipment to accomplish this. It is also desirable to provide a welding apparatus for disposing two sheets of steel in a predetermined position with respect to one another so that they may be welded, which welding apparatus permits the welding seam to be continued underneath it. In other words the welding fixture or jig while holding the plates together in a predetermined position must also allow the welder to have access to the line along which the weld is being made without the jig or fixture interfering with the welding operation.

In accordance with the present invention a novel fixture or welding jig is provided whereby two separate sheets of steel plate may be located in juxtaposition to each other to provide means whereby the two plates may be welded together whether they are at right angles to one another, or whether they have their adjacent edges disposed in the same plane welded to one another.

It is another object of the present invention to provide a rugged yet simple welding fixture or jig that can be readily attached and detached to two sheets of steel plate to be welded together.

It is another object of the present invention to provide a welding jig or fixture for attachment to two sheets of steel plate to be welded to one another which has a substantially large passageway provided therein or extending therethrough so that the welding operation can be performed along a continuous and complete line and the fixture or jig itself does not defeat the purpose for which it is made.

It is another object of the present invention to provide a rugged yet simple welding jig or fixture for holding two steel plates together in a predetermined location until they are welded together which is provided with adjustable wedge means so as to precisely locate and space the adjacent edges of the plate to be welded together.

Various other objects and advantages of the present invention will be readily apparent from the following detailed description which when considered in connection with the accompanying drawings forming a part thereof and in which:

FIG. 1 is a perspective fragmentary view of two sheets of steel plate disposed alongside of one another and with welding lugs affixed thereto for receiving the novel welding fixture or jig of the present invention.

FIG. 2 is a perspective view similar to FIG. 1 showing one embodiment of the present invention mounted on the lug means affixed to the sheet.

FIG. 3 is a top plan view of the welding fixture shown in FIG. 2 with wedge means mounted therein and the plates in a predetermined location for commencing welding along the adjacent edge of said plates.

FIG. 4 is a side elevational view of the welding fixture of the present invention taken along lines 4—4 of FIG. 3.

FIG. 5 is a bottom plan view taken along lines 5—5 of FIG. 4.

FIG. 6 is an enlarged perspective detailed view of the welding fixture embodied in the present invention.

FIG. 7 is a view taken along lines 7—7 of FIG. 6.

FIG. 8 is a fragmentary perspective detailed view of the welding fixture of FIG. 6.

FIG. 9 is a fragmentary perspective view of another embodiment of the invention shown in FIG. 8.

FIG. 10 is another embodiment of the welding fixture of the present invention shown in perspective.

FIG. 11 is a side elevational view of the embodiment of the invention shown in FIG. 10 for welding two plates together at right angles.

FIG. 12 is a section taken along lines 12—12 of FIG. 11.

Referring to the drawings, the reference numerals 10 and 11 represent two separate sheets of steel plate having adjacent edges 12 and 13 respectively to be welded together. The steel plates 10 and 11 may comprise any structure, that is they may be two sheets to be incorporated in the hull of a ship, a boiler, and so on. Before utilizing the welding fixture of the present invention it is first necessary that the sheets 10 and 11 be provided with apertured holding lugs 14 and 15 welded adjacent the edges 12 and 13 in substantial alignment with one another. The holding lugs 14 and 15 generally comprise upstanding rectangular members having a rectangular opening 16 and 17 respectively therein. The holding lugs 14 and 15 are generally welded to the plates 10 and 11 at right angles thereto and further disposed in spaced relationship with one another at approximately a distance sufficient to mount the welding fixture of the present invention thereon. It is also apparent there may be a series of holding lugs 14 and 15 disposed in two rows and welded to the plates 10 and 11 along the adjacent edges 12 and 13, so that a number of welding fixtures of the present invention may be utilized along the seam to be welded to perform a continuous weld therealong in one single operation.

The welding fixture or jig is generally designated 18 and comprises a central bridge portion 19 for bridging across the adjacent edges 12 and 13 and oppositely disposed side portions 20 and 21. The bridge portion 19 is substantially upright or vertical and is rectangular in shape. It is provided with an enlarged circular opening forming a passageway 23 completely therethrough on its underside adjacent the plates 10 and 11. The passageway 23 is formed by a generally convex surface 24 opposite the flat top surface 25. The radius of the passageway is such that the passageway extends a substantially distance on opposite sides of the adjacent edges 12 and 13 so that the welding operation can be carried out between edges 12 and 13 beneath the fixture and on both sides of the fixture since the passageway provides access to this portion of the plates. The opposite side walls 26 and 27 of the bridge portion 19 are vertical and flush with the side walls 28 and 29 of the portions 20 and 21 respectively. The portions 20 and 21 have an enlarged lower rectangular base 30 and 31 respectively, forming lateral shoulders 32 and 32' respectively on opposite sides thereof adjacent the walls 28 and 29 respectively so that the bridge portion 19 and the side walls 28 and 29 are laterally offset with respect to the portions 30 and 31.

Large recesses 33 and 34 are formed in portions 20 and 21 respectively and extend completely between the opposite side walls thereof. The recesses 33 and 34 extend longitudinally of the fixture 18 between upstanding projections 35 spaced on oppositely disposed sides of the bridge 19. The projections 35 have their outer side wall 36 inclined upwardly and inwardly and terminate as indicated at 37 substantially below the top wall of the bridge 19. The inner wall of the projection 35 as indicated at 38 forms an angle with the bottom 40 of the recesses 33 and 34. The inner wall 41 of the recesses 33 and 34 is also bevelled or tapered so that the portion of the recesses 33 and 34 adjacent the bottom 40 is wider than the portion of the recess adjacent the top portion 37 of the projections 35. The purpose of the tapered configuration of recesses 33 and 34 will appear hereinafter.

The bottoms 40 of the recesses have rectangular openings 42 therein extending completely through the portions 20 and 21 so that the holding lugs 14 and 15 can extend therethrough. Attachment lugs 43 have an aperture therethrough and are provided on portions 20 and 21 adjacent the outer wall 36 thereof so that a cable may be attached to the fixture for lifting the fixture or a safety chain may be connected to the attachment lugs for attaching the fixture to one of the workpieces.

It is to be noted that the openings 42 extend longitudinally of the fixture and are substantially longer than the length of the holding lugs 14 and 15 and have a loose sliding fit with the holding lugs 14 and 15 so that the fixture may be easily lifted and mounted over the holding lugs 14 and 15 when it is desired to mount the fixture onto the plates 10 and 11. Also the openings 16 and 17 in the holding lugs 14 and 15 are disposed therein so that they extend a substantial distance above the bottom 40 of the recesses 33 and 34 so that a wedge member or wedge pin 45 as best seen in FIG. 6 can be inserted through the openings of the holding lugs 14 and 15 in order to secure the fixture to the plates 10 and 11. The portions 20 and 21 below the recesses 42 are provided with enlarged rectangular cutouts or recesses 46 therein as best shown in FIG. 8. The opposite ends of the holding lugs 14 and 15 are thus spaced from the opposite sides of the recesses 33 and 34 in order to receive wedge members or pins 48 therethrough.

The wedge pins 45 and 48 are of similar construction, these wedges pins having opposite side walls which are substantially parallel with one another while they are tapered longitudinally by providing a sloping surface 49 which slopes from the enlarged end portion thereof to the smaller end portion thereof, this sloping surface tapering toward the opposite surface 50.

It will be noted that while wedge pins 45 and 48 are similar in constructions, the pins 48 may be of a lesser thickness so as to readily fit between the opposite surfaces of lugs 14 and 15 and the adjacent side walls of recesses 33 and 34.

It will also be noted that wedge pin 45 is inserted through the openings in the holding lugs with the sloping surface 49 thereof directed upwardly while the wedge pins 48 are inserted in oppositely facing directions as shown, with the sloping surfaces 49 thereof facing laterally.

When it is desired to position two steel plates such as 10 and 11 adjacent one another in a predetermined position, and after the holding lugs 14 and 15 have been welded thereto, as shown in FIG. 1, the fixture 18 is thereafter mounted over the holding lugs 14 and 15 as shown in FIG. 2 with the holding lugs threaded through the recesses 42 and the recesses 33.

Thereafter, the middle wedge pin 45 is inserted through the opening 16 and 17 in the holding lugs and is ready to be driven therethrough until the tapered surface 49 and the bottom 50 of the pin properly bind the fixture in a predetermined location and position to hold the plates in fixed relationship with each other for performing the welding operation along the adjacent edges 12 and 13. The wedges 48 are thereafter positioned between the holding lugs 14 and 15, and the inner and outer side walls 41 and 38 respectively of the recesses 33 and 34 and are used to shift the sheets laterally with respect to each other. For example, the wedges 45 and 48 may be driven home adjacent lug 14, and thereafter the wedges in the holding lug 15 may be driven home to shift the plate 11 to the left or right or laterally of the plate 10 to adjust the exact position desired for welding the seam.

It should be understood that the sequence of driving the various wedge pins into position for locking the fixture to the plates and shifting the plates with respect to one another may be varied as desired, and for example, the wedge pin 45 and wedge pins 48 may firstly be driven into place with respect to lug 14 to lock the fixture to plate 10 whereupon the wedge pins 45 and 48 associated with lug 15 can subsequently be driven into place to properly position the plates with respect to one another.

As seen in the drawing, the wedge pins 48 are disposed in the bottom portions of the recesses 33 and 34, and the tapered walls 38, 41 of the recesses prevent wedge pins 48 from working upwardly out of the recess as the wedge pins are driven into place. This tapered configuration of the recesses ensures that the wedge pins will operate in the intended manner and will not be displaced upwardly in the recesses during use of the apparatus.

The embodiment of the invention shown in FIG. 9 is substantially the same in structure as that previously described except that the central passageway 23 instead of having a convex arcuate surface is provided with a substantially cylindrical surface 53 disposed between oppositely disposed flat surfaces 54 inclined upwardly and outwardly therefrom to a point adjacent the side walls 29 thereof.

The embodiment of the invention shown in FIGS. 10 to 12 is substantially the same as that already described for the first embodiment of the invention, except that this fixture is what is known as a hinged fixture and can be used to weld together two steel plates disposed in the same plane or two steel plates disposed at an angle with respect to one another, such as a right angle. In this embodiment of the invention the fixture is provided with a hinged bridge portion 60 formed by two sections 61 and 62 which are substantially upright and vertical and provide an enlarged archway or central passageway 63 therebetween to span the gap and extend a substantial distance beyond the edges 12 and 13 of the plates 10 and 11. Section 62 of the bridge is provided with circular lugs 64 spaced from one another to receive the complementary or mating circular lug 65 of section 61 so that it can be sandwiched therebetween. A central opening is provided in these lugs to receive a pin 66 secured thereto to provide a hinge member. In this embodiment of the invention everything else is substantially the same as that already described for the previous embodiments, except this hinge arrangement formed in the archway. The holding lugs 14 and 15 are welded to the plates 10 and 11 as before and the fixture is mounted thereon as already described and the wedges 45 and 48 are assembled and hammered home in the same manner. This is clearly shown in FIG. 10.

However, in FIG. 11, the flexibility of the hinged fixture device is apparent since the plates 10 and 11 can be disposed at right angles with one another, or at any other desired angle, and can be rigidly held in a predetermined location until a seam is welded between the adjacent edges 12 and 13. It will be noted that when the two plates 10 and 11 are disposed at an angle with one another such as is shown in FIG. 11, the central passageway 63 provided between the sections 61 and 62 is still sufficiently large though of a different configuration than a plain arch so that the welding operation may be welded completely through the adjacent edges 12 and 13 of the two plates from one side of the fixture to the other side of the fixture without at all interfering with the welding operation.

The remaining portions of the fixture shown in FIGS. 10–12 are similar to those shown in the previously described modification, and have been given the same reference numerals primed. This latter described modification is shown in FIG. 10 in association with a pair of plates disposed in substantially the same plane, while the apparatus is shown in FIGS. 11 and 12 as associated with a pair of plates to be welded together at substantially right angles to one another. It will be understood that the operation of the apparatus shown in FIGS. 10–12 and the manner in which the wedges are driven into place is substantially identical with that of the previous modification.

Thus from the foregoing description it is apparent that the present invention provides a novel fixture device for holding two heavy steel plates in a predetermined location with respect to one another, with easy adjustment to a precise predetermined location or disposition to permit the welding or joining of the two plates together along a given edge, whether the plates be disposed in the same plane or at a specific angle with each other, and further a large central passageway is provided in the fixture so that once the fixture is rigidly secured to the plate it will in no way interfere with the welding operation and it may be continuous.

Inasmuch as various changes may be made in the form, location and relative arrangement of the several parts without departing from the essential characteristics of the invention, it will be understood that the invention is not to be limited except by the scope of the appended claims.

I claim:

1. Welding apparatus for welding the edges of two members together and comprising an elongated welding fixture having oppositely disposed spaced side portions and a central upstanding bridge portion connecting the inner ends of said side portions to one another, said side portions defining spaced inner support surfaces lying substantially in a plane adapted to engage members to be welded together, said central bridge portion extending from the outer surface of said side portions and projecting away from said support surfaces beyond the outer surfaces of said side portions in a direction perpendicular to said support surfaces, said central bridge portion defining on its underside an arcuate opening forming a passageway completely therethrough and facing in a downward direction so that a welding operation can be carried out between edges of members to be welded beneath the fixture on both sides of the fixture, said passageway being formed by a generally convex surface having sides converging toward said opening, each of said side portions having an upstanding projection thereon spaced from said central bridge portion to define a pair of recesses formed at either side of said bridge portion, each recess being defined between an inner wall formed on one of said projections and a facing opposed inner wall formed on said central bridge portion, the opposite inner walls of each recess being tapered so that the bottom portion of each recess is wider than the portion of the recess adjacent the top portion of the associated projection, each of said side portions having an opening formed therethrough and in communication with the bottom of one of said recesses for receiving apertured holding lugs on members to be welded together, and first wedge means adapted to be extended through said apertured holding lugs for urging the support surfaces of said side portions into engagement with the surfaces of members to be welded together.

2. Apparatus as defined in claim 1 including second wedge means adapted to be engaged between the inner surface of each of said projections and one side of an associated holding lug, and third wedge means adapted to be engaged between each of said inner surfaces of the central bridge portion and the opposite sides of the associated holding lugs.

References Cited by the Examiner
UNITED STATES PATENTS

| 2,101,856 | 12/37 | Hines | 113—99 |
| 2,216,702 | 10/40 | Cole | 113—99 |
| 2,216,739 | 10/40 | Hines | 113—99 |
| 2,306,032 | 12/42 | Baumgard | 113—99 |
| 2,469,965 | 5/49 | Holt | 113—99 |
| 3,095,844 | 7/63 | Thielsch | 113—102 |

FOREIGN PATENTS 682,269  11/52  Great Britain.

CHARLES W. LANHAM, *Primary Examiner.*

JOHN F. CAMPBELL, *Examiner.*